May 8, 1951      C. V. BOCCIARELLI      2,552,139
ELECTRICAL SYSTEM
Filed June 17, 1948      2 Sheets-Sheet 1
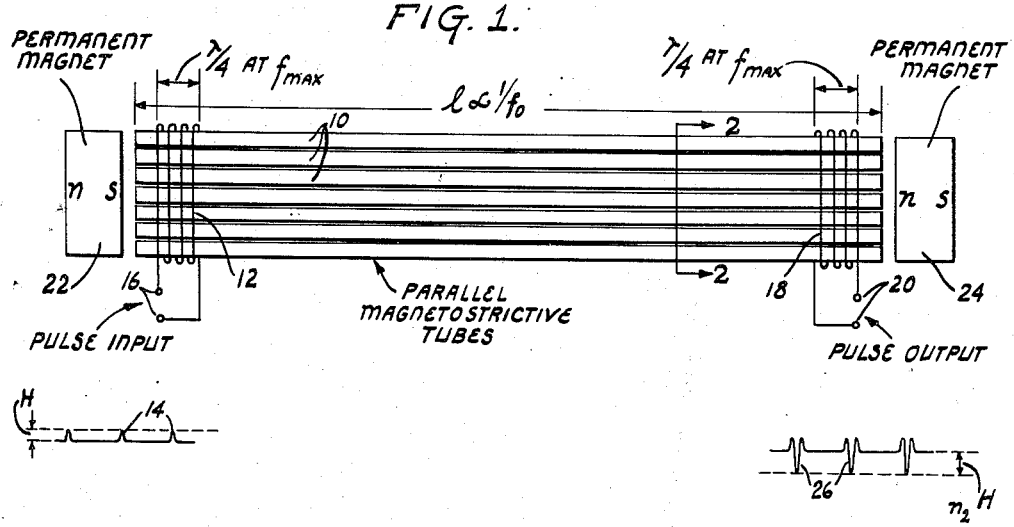
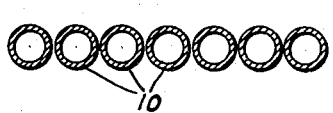
FIG. 2.
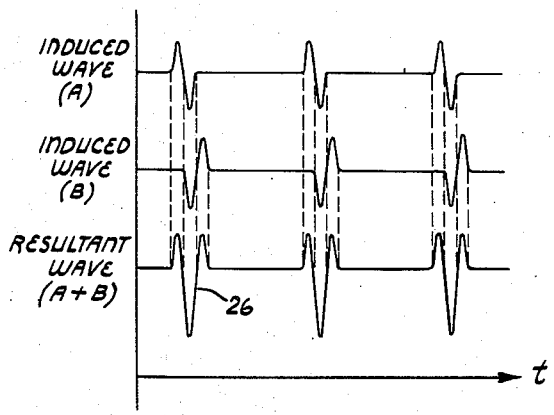
FIG. 3.
FIG. 3A.
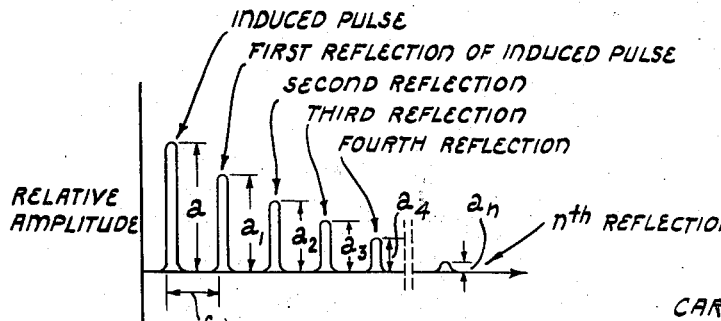
INVENTOR.
CARLO V. BOCCIARELLI
BY Brown, Denk & Synnestvedt
AGENTS May 8, 1951     C. V. BOCCIARELLI     2,552,139
ELECTRICAL SYSTEM Filed June 17, 1948     2 Sheets-Sheet 2

INVENTOR.
CARLO V. BOCCIARELLI
BY
Brown, Denk & Lynnestvedt
AGENTS

Patented May 8, 1951

2,552,139

UNITED STATES PATENT OFFICE 2,552,139

ELECTRICAL SYSTEM

Carlo V. Bocciarelli, Elkins Park, Pa., assignor to Philco Corporation, Philadelphia, Pa., a corporation of Pennsylvania Application June 17, 1948, Serial No. 33,543

6 Claims. (Cl. 250—27)

The present invention relates in general to magnetostrictive apparatus, and also to a television system employing such apparatus.

The phenomenon of magnetostriction is well known. When a body composed of suitable magnetostrictive material is placed in a magnetic field, stresses are produced within the body tending to distort it. Inversely, when such a body is distorted, there is a change in its magnetic permeability. Magnetostriction is exhibited by a considerable number of metals and alloys, but it appears to be most pronounced in alloys of iron, nickel and chromium. If a rod or a bar of such material is magnetically polarized, and then placed within a coil carrying alternating current, the rod or bar will vibrate longitudinally at the frequency of the alternating current. If this frequency is at the same time the resonant frequency of the rod or bar, then the amplitude of the vibration will be large even for a relatively small current in the coil. Thus, the rod may be considered to be the equivalent of a parallel tuned circuit.

The above described device may be employed as the frequency-determining element of a vacuum tube oscillator. In such an arrangement, a first coil, connected in the anode-cathode circuit of the tube, customarily encircles one portion of the magnetostrictive bar, while a second coil, connected in the grid-cathode circuit of the tube, encircles another portion of the bar. In many instances these coils are placed at the respective ends of the bar, and the latter is then clamped in the middle (a node of its mechanical vibration) so that the ends of the rod are free to oscillate.

The present invention makes use of this phenomenon of magnetostriction, while at the same time eliminating many of the disadvantages inherent in the devices of the prior art. In one embodiment, the apparatus is particularly adapted to receive input energy in the form of cyclically recurring pulses, such as are generated, for example, in television transmitting systems to insure synchronization of the scanning action of the cathode ray beam of the image-reproducing tube with the scanning action of the cathode ray beam of the camera tube. Not only does the device of the present invention effectively suppress noise or other interference present in the received signal, but at the same time it is much simpler structurally than are the arrangements of the prior art.

In a preferred design, a plurality of magnetostrictive tubes, positioned side-by-side in parallel relation, are driven by an input coil encircling one portion of the assembly and covering a longitudinal section thereof preferably no longer than one quarter wavelength of the highest frequency to be passed. A second coil encircles another portion of the assembly and acts as a source of output voltage. If a series of regularly recurring pulses of current are caused to flow through the first coil, and if the magnetostrictive tubes are so designed and dimensioned to be resonant at this recurrence frequency or a selected sub-multiple thereof, then the amplitude of the output energy will reach a relatively high value. A simplified explanation of this action can be given by considering the input and output coils to be so spaced with respect both to each other and to the ends of the magnetostrictive tube assembly that, upon the application of an input pulse to the input coil, two impulses will begin traveling in the tube assembly, one to the right and one to the left of the said coil. These impulses are reflected from the respective ends of the assembly back toward the source, and may be so phased with respect to each other as to be additive at the output coil, or to give any other desired phase relationship. Thus, by a process of multiple reflection and successive summation, the desired impulses are built up in amplitude to an extent limited only by the "Q" of the magnetostrictive member. However, incoming pulses of random frequency, or of frequencies which are not an integral multiple of the resonant frequency of the magnetostrictive tube assembly, will be correspondingly attenuated. It will also be shown that the width of the pass-band of the device may be readily changed by the use of magnetostrictive tubes having dissimilar dimensions, compositions, or configurations.

In the field of television, considerable difficulty is often encountered in achieving precise synchronization of the receiver and transmitter. This condition, which depends upon the reception of the synchronizing pulses which appear in the composite television signal, is often affected by noise or other random impulses which are either of such amplitude or frequency as to overcome the normal action of the synchronizing pulses in controlling the operation of the scanning generators. This causes these generators to fall out of step with the corresponding generators at the transmitter, and results in distortion of the reproduced image. Examples of noise or interference which might bring about such a condition include not only static but also man-made disturbances from vehicle ignition systems or neighboring electric motors.

In an attempt to overcome or reduce the harmful effects of noise, various arrangements have been devised. One of these is the so-called automatic frequency control (AFC) system, which customarily makes use of the difference in phase between two electrical waves to produce a resultant control voltage, the magnitude of which is a function of the degree of phase displacement. In one design, the two waves which are thus compared comprise the train of sync pulses and a sine wave voltage from a stable oscillator. Such prior devices have not, however, proven entirely satisfactory.

It has been found that a magnetostrictive filter, constructed in accordance with the present invention, is especially suited for use in connection with a television receiver for the purpose of producing a train of synchronizing pulses which are substantially free from noise. Tests have demonstrated that the synchronizing pulses thus produced are of sufficient amplitude, and so free of disturbances, that they may be used directly in controlling the operation of the horizontal, or line, discharge tube without the employment therewith of the conventional blocking oscillator or multivibrator. In this way, it is possible to simplify the usual circuits required for image reproduction, and, at the same time, preclude such failure of the synchronizing circuits as would otherwise result from the reception of spurious impulses.

The magnetostrictive elements employed heretofore as filters were subject to a number of design limitations which placed severe restrictions upon their efficiency. Since the magnetostrictive member is conventionally a single solid rod or cylinder, the output of the filter is limited by a number of factors. The latter include eddy current losses within the material of the tube, the dispersion of energy in radial directions (especially the higher harmonics of the fundamental input frequency), and the rigidity of the frequency band over which the device is effective. In a preferred embodiment of the present invention, these drawbacks are largely overcome by making the magnetostrictive member hollow and, in addition, making it of small diameter. This has the twofold effect of reducing eddy current losses and decreasing the radial dispersion of energy. Since the above changes also reduce the amount of energy which can be transmitted longitudinally, a plurality of parallel tubes in close proximity to one another are employed. The band width of the filter is now readily adjusted by selecting tubes whose lengths differ slightly, each covering a slightly different portion of the frequency spectrum.

One object of the present invention, therefore, is to provide an improved magnetostrictive device especially adapted to receive input energy in the form of regularly recurring pulses.

Another object of the invention is to provide an improved magnetostrictive device of high "Q" in which eddy currents in each vibrating element are reduced in amplitude and the radial dispersion of energy held to a minimum.

An additional object of the invention is to substantially reduce the deleterious effects of noise on the scanning action of a television receiver.

A further object of the invention is to provide an improved synchronizing circuit for television receivers and the like.

In accordance with one feature of the invention, there is provided an improved magnetostrictive core assembly comprising a plurality of hollow elongated members positioned in closely-grouped parallel relation, the frequency-response characteristic of the assembly being determined principally by the relative lengths, composition and losses of the individual members of the assembly.

In accordance with another feature of the invention, the disclosed magnetostrictive device is employed in connection with a television receiving system, the synchronizing pulses derived from the magnetostrictive device being utilized directly (i. e. without the interposition of a relaxation oscillator) to control sweep circuits of the television receiver.

Other objects and features of the invention will be apparent from the following description of preferred forms of the invention, and from the drawings, in which:

Fig. 1 is partly schematic plan view of a magnetostrictive device in accordance with the present invention;

Fig. 2 is a cross-sectional view of a portion of Fig. 1 taken along the line 2—2;

Figs. 3 and 3a are graphs illustrating waveforms which may be helpful in explaining the operation of the magnetostrictive device of Fig. 1;

Figure 5:
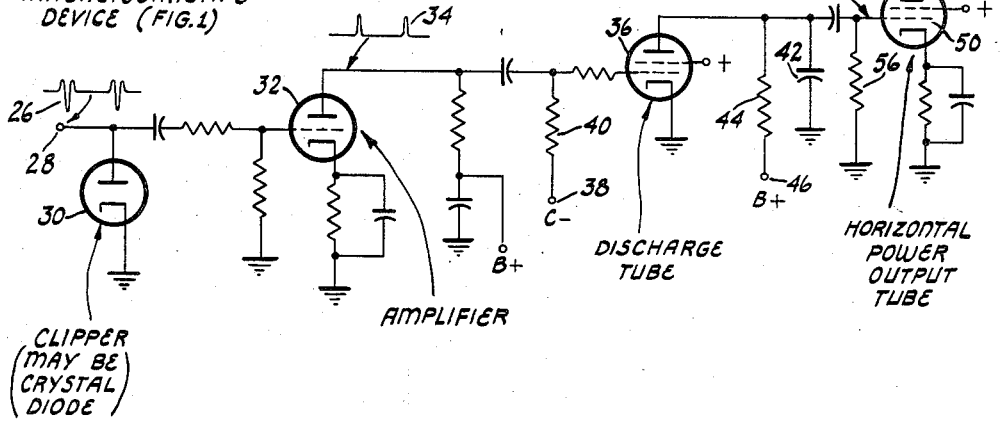
Fig. 5 is a circuit diagram of a portion of a television receiver adapted to utilize the synchronizing pulse output of a magnetostrictive device constructed in accordance with the present invention.

Referring now to Figs. 1 and 2, there is shown a magnetostrictive core assembly comprising a plurality of hollow tubular members 10. In a preferred embodiment the material of which the members 10 is composed may be nickel, although various alloys of iron and chromium may also be used. The tubular members 10 are preferably positioned side-by-side in parallel relation as illustrated, but they may, if desired, be associated in any other suitable closely-grouped manner. A coil 12 encircles one portion of the core assembly, and serves as a medium whereby applied electrical energy may be converted into mechanical vibrations in the core. This electrical energy is in the form of a series of regularly recurring pulses 14, having sharply rising leading edges, which are applied to the coil input terminals 16. A second coil 18 encircles another portion of the core assembly. The terminals 20 of this coil serve as the output terminals of the system. A pair of permanent magnets 22 and 24 are respectively located at or near the ends of the core assembly and act to polarize the latter in a known manner, although other means for obtaining this polarizing action may be employed, such, for example, as through the passage of a direct current through one or both of the windings 12 and 18.

The tubular members 10 are of hollow configuration, as shown in Fig. 2, the wall of each tube being relatively thin in comparison with the outside diameter of the tube. For example, a device of the character described which successfully operated with a pulse input of approximately 15.75 kilocycles comprised seven parallel tubes each 12½" long, of .125" diameter, and having a wall thickness of .010". However, the dimensions of these tubes, as well as the number thereof, is obviously dependent upon the particular frequency to be passed and also upon the desired "Q" of the device. The latter factor may be altered by changing the anneal of the metal, while the former is related to the overall length of the parallel tube assembly, which should be proportional to $1/f_0$ where $f_0$ is the fundamental frequency of the input pulses 14. Also, for maximum efficiency, the particular longitudinal portion of the tube assembly covered by each of the coils 12 and 18 should preferably not exceed one-quarter wavelength of the maximum frequency to be passed by the device if the sharply rising edges of the pulses 14 are to be preserved.

The operation of the apparatus of Fig. 1 is such as to produce an output pulse whose waveform is dependent upon the relative positioning of the coils 12 and 18. One possible waveform is represented in the drawing, where it is identified by the reference numeral 26. The theory underlying the operation of the apparatus is rather involved, and it is not deemed necessary to set it forth in detail in the present application. A simplified explanation, however, may be given with the aid of the graphs of Figs. 3 and 3a. In Fig. 3 is shown a vibrational wave A which is induced in the core assembly of Fig. 1 when an input pulse 14 flows through coil 12. The vibrational wave A travels toward one end of the core assembly. This same input pulse 14 also induces in the core another vibrational wave B which travels in the opposite direction toward the other end of the assembly. Upon reaching their respective ends, the two waves are reflected back, and arrive at the output coil 18 with a particular phase displacement. By selectively positioning the coils 12 and 18, both with respect to each other and with respect to the ends of the magnetostrictive core assembly, this phase displacement may be such, in accordance with one mode of adjustment, that portions of these two waves having like polarity add together to produce a resultant wave 26 having an amplitude equal to the sum of the amplitudes of the component waves.

In Fig. 3a is illustrated the manner in which the amplitude of an output pulse is increased relative to the amplitude of the input pulses. This action may be termed "pulse stacking," or "pulse build-up." A pulse induced at one end of the magnetostrictive core assembly travels along the core until it reaches the opposite end of the assembly, whereupon it is reflected back toward the source. The time necessary for the induced pulse to make one complete journey along the core assembly and back to its starting point is equal to $2/f_0$ or 127 microseconds when the fundamental frequency $f_0$ is equal to 15.75 kilocycles.

In one physical embodiment of the device, the magnetostrictive core assembly resonated at one-half this fundamental frequency $f_0$. Accordingly, at any one instant one induced pulse may be viewed as making its initial journey from the input coil to one end of the assembly, and another induced pulse may be viewed as traveling from that end of the assembly back to the input coil. By the time that the first induced pulse has returned to its starting point, a second induced pulse has already traveled the length of the core, and the next following, or third, pulse is at that precise moment being induced. Similarly, when the second induced pulse arrives back at its original starting point, the fourth successive input pulse is then being applied. Consequently, it will be seen that the even-numbered input pulses will in effect add together, and in a similar manner the odd-numbered input pulses will also be additive.

Fig. 3a shows how successive reflections of an induced pulse result in the amplitude $a$ of this pulse being steadily attenuated until the time when, at its $n$th reflection, it is of negligible amplitude $a_n$. The number of such reflections or, in other words, the value of $n$, varies in direct proportion to the "Q" of the core assembly.

The once-reflected pulse arrives back at its starting point at the precise instant when a new input pulse is induced having an amplitude equal to the amplitude of the reflected pulse before such reflection occurred. In a similar manner, the once-reflected pulse is again reflected, and its transit time is such that it arrives back at the source just at the moment when still another input pulse is induced. Each successive reflection of the original pulse thus in effect "boosts" the original pulse amplitude by an amount equal to the amplitude of that particular reflection. Consequently, the output pulse which may be obtained from the magnetostrictive assembly is effectively equal to the amplitude of one induced pulse plus the sum of the amplitudes of each successive reflection of that pulse. In this way, pulses representing the successive reflections of an original pulse in effect "stack," or "build-up," one upon the other to a value which is dependent upon the total number of reflections.

The above explanation has been intentionally condensed in order to simplify the description and drawings of the present application, and has accordingly omitted consideration of the effects of the loss of the higher harmonics of the input frequency $f_0$ upon the degeneration of a normal waveform. For a more detailed discussion of this subject, reference is made to an article by G. Bradfield entitled "A New Electro-Acoustic Transducer" which appeared on pages 74–78, inclusive, of the March 1948 issue of the publication "Electronic Engineering."

It has been found that the magnetostrictive apparatus of Fig. 1 is particularly effective in suppressing noise or other interference which is present in the input wave along with the regularly recurring pulses 14. This attenuation is substantially in proportion to the "Q" of the device, and hence, by raising the latter, it is possible to provide almost complete rejection of spurious noise impulses. However, there are many applications in which a relatively low "Q" is actually preferable in order to provide a sufficiently wide passband to allow for a certain amount of frequency drift in the incoming pulse train. In practice, the "Q" of a device constructed in accordance with the showing of Fig. 1, and having the dimensions above given, has been varied from a low of about eight to a high of several thousand.

The magnetostrictive device of the present invention thus derives its high efficiency from a number of factors. Since previously used magnetostrictive mechanisms usually included a single rod or bar, the output was severely limited by eddy currents induced in the bar, and also by the loss of the higher harmonics of the input energy wave through radial dispersion within the material of the bar. In accordance with the present invention, these losses are greatly reduced by making the tubular members 10 of hollow configuration. The thinness of the walls of these tubes acts to preclude any appreciable radial dispersion of high-harmonic energy and to substantially eliminate the formation of eddy currents. Although, for a single tube, this would also correspondingly reduce the total longitudinal transmission of energy, nevertheless the use of a plurality of parallel tubes permits this aggregate amount of transmitted energy to reach a satisfactory level.

Figure 4:
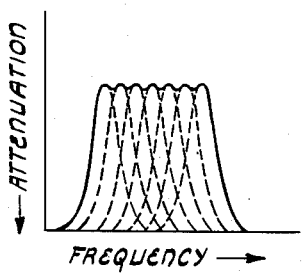
Fig. 4 is an example of one possible frequency response curve which may be obtained from the device of Fig. 1.

Fig. 4 is a graph illustrating a typical frequency response characteristic for a magnetostrictive device constructed in accordance with the principles of the present invention. By varying the design of the individual magnetostriction tubes, the frequency characteristic may be made almost any desired arbitrary function between the upper and lower cutoff limits of the assembly. For instance, as illustrated in Fig. 4, the overall assembly may be made to possess extremely sharp cutoffs, with each of the tubes 10 giving in effect the equivalent of an isolated pole. Also, the "Q" of each tubular member 10 may be preselected over a wide range to further increase the designer's control of the frequency response characteristic.

The device above described is particularly suited for use in a television receiving system where it acts to maintain precise synchronization between the corresponding scanning generators at the transmitter and receiver. It is well known in the art that loss of synchronization frequently occurs due to the reception of spurious signals which are of such amplitude and/or frequency relative to the synchronizing pulses as to cause premature operation of the deflection circuit at the receiver. Not only does applicant's magnetostrictive apparatus greatly reduce the possibility of such an occurrence but, as will be subsequently brought out, it also permits a simplification of the circuits normally required for image reproduction.

Referring now to Fig. 5, there is shown a portion of a television receiving system utilizing the synchronizing pulse output of a magnetostrictive device constructed in attendance with the present invention. The circuit illustrated is designed to bring about a horizontal, or line, deflection of the cathode ray scanning beam of an image-reproducing tube, and at the same time maintain this deflection in synchronism with the corresponding movement of another cathode ray beam in the camera, or pickup, tube at the transmitter.

Accordingly, let it be assumed that the device of Fig. 1 is adapted to receive a series of input pulses 14 which constitute the horizontal synchronizing pulses derived from a composite television signal, the latter being acted upon by suitable means (not shown) which separates these horizontal synchronizing pulses from the video portion of the signal. The input pulses, which may for example be of an amplitude designated as H in Fig. 1, are applied across the terminals 16 of the input coil 12, and, after being taken off across the output terminals 20 of coil 18, have the waveform indicated by the numeral 26. The height of each output pulse will thus be $n_2.H$, where $n_2$ is in effect the amplification factor of the magnetostrictive device. While this latter factor may vary considerably in practice, it has been found that a value of approximately 4 is adequate. The fundamental frequency $f_0$ of the pulses 14 is of course the presently standard horizontal line frequency of 15,750 cycles per second.

Referring again to Fig. 5, it will be seen that this output wave 26, taken from across the terminals 20 in Fig. 1, is applied to the deflection circuit input terminal 28. Since only the negative portion of this wave 26 is to be used, a diode rectifier 30 is connected as a clipper so as to conduct on the positive portions of the wave. The resulting pulses, after being amplified in substantially linear fashion by a further tube 32, appear with positive polarity on the plate of this tube as shown at 34.

The pulses 34 are now applied to the control electrode of a further tube 36 which may be the usual discharge tube customarily found in television deflection circuits. This tube 36 is normally biased beyond cut-off by connecting the lower terminal 38 of grid resistor 40 to a suitable source of negative potential. Thus the discharge tube 36 is normally non-conductive except during the time intervals that the positive pulses 34 are applied to the control electrode thereof.

A capacitor 42 is arranged to be charged through a resistor 44 from a source of positive potential, B+, connected to the terminal 46. Accordingly, a normal cycle of operation will find the charge on capacitor 42 rising substantially linearly during the time that tube 36 is cut off. Arrival of a pulse 34 on the grid of tube 36, however, renders the latter conductive to discharge capacitor 42, and thus there is generated a varying voltage for application to the control electrode 50 of the horizontal power output tube 52. The latter is adapted to produce a sawtooth wave of current which flows through the horizontal deflection coils and results in a linear movement of the cathode ray scanning beam of the image-reproducing tube (not shown). It will be noted that the waveform 53 of the voltage on the grid 50 of the power output tube 52 has a substantially flat upper portion 54, this being caused by the flow of grid current in output tube 52 when the applied voltage 53 reaches a predetermined value.

It will be appreciated that the deflection circuit of Fig. 5 functions without the use of the usual relaxation oscillator and thus is less complex than are the circuits presently employed in production. While the disclosed arrangement has been constructed and found to perform satisfactorily, no attempt has been made to arrive at the minimum number of components which are necessary for satisfactory operation. For example, under certain circumstances the amplifier tube 32 might be eliminated, and the pulses 26 derived from the coil 18 (Fig. 1) in positive polarity.

In one physical embodiment of the present invention the magnetostrictive tube assembly had an effective "Q" of approximately 30. An amplitude-limited signal comprising synchronizing pulses and randomly-spaced noise impulses of identical amplitude was applied to the input terminals 16 of the magnetostrictive assembly. It was then found that the noise impulses appeared at the output terminals 20 with an amplitude equal to only 1/30 of the height $n_2.H$ of the desired synchronizing pulses. A noise pulse of this relative amplitude has no appreciable effect upon the operation of the disclosed deflection circuit.

Another advantage provided by the magnetostrictive device of the present invention is that an output pulse may be obtained therefrom which is advanced in phase with respect to the input pulse due to the relative positioning of the input and output coils. This can best be comprehended by visualizing each output pulse as resulting from the combined action of many previous input pulses each of which undergoes multiple reflections which are so time-related as to "stack," or "build-up" in amplitude. Consequently, although any particular output pulse is made up of many component pulses each of which has undergone various periods of time-delay, nevertheless, each output pulse may occur at the precise instant when a new input pulse is induced in the magnetostrictive core assembly. It may also occur prior thereto when the output coil is so adjusted in position as to derive a voltage from the reflected pulses at a time when the latter possess different phase relationships. The above feature is of importance in applications where the output pulse is used as a timing or synchronizing signal, since the availability of a phase-advanced triggering pulse reduces the time interval within which the following circuits must operate to achieve a precisely coordinated condition. In other words, the responsiveness of many of the circuit components may be made less critical, with a consequent saving in manufacturing costs.

Figure 6:
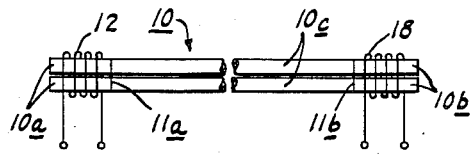
Figs. 6 and 7 are each plan views of modifications of the device of Fig. 1.

In Fig. 6 there is illustrated a modification of the magnetostrictive device of Fig. 1 in which the tubes 10 are each composed of at least two different materials. It has been found advantageous in certain applications to employ a material having a certain "Q" for that section of each member 10 which is encircled by one of the coils 12 and 18, and then to employ a material having a different "Q" for the remaining section of the member lying between such coils. In Fig. 6, for example, the sections 10a and 10b of each tubular member 10 which are encircled respectively by the coils 12 and 18 may be composed of a magnetostrictive material such as nickel having a desired magnetic permeability, but a relatively low "Q." The remaining section 10c lying between the coils may be composed of a material having a much higher "Q," such as steel or magnesium, the magnetic permeability of the section 10c being of no significance. When these portions are properly welded together at 11a and 11b, very little reflection of energy will occur at the joints, and it has been found possible to raise the "Q" of the section 10c to a value of several thousand while the end pieces 10a and 10b each have a "Q" below 100.

Figure 7:
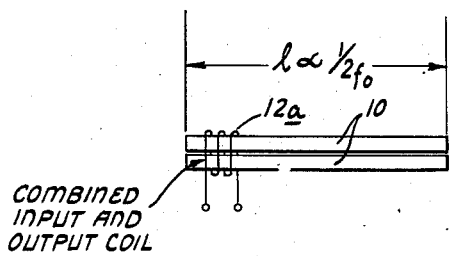

Fig. 7 illustrates a modification of Fig. 1 in which a single coil 12a serves as both the input and output section of the system. In other words, the input pulse energy is caused to flow through the coil 12a, with the latter acting in addition as the source of output voltage when employed in connection with any suitable form of conventional separating circuit (not shown). The overall length of the tube assembly in Fig. 7 is one-half of Fig. 1, or ½f₀, and has a time delay of 31.75 microseconds when $f_0 = 15.75$ kilocycles as in the illustration above given.

While the magnetostrictive core assembly of applicant's invention has been illustrated as having particular longitudinal dimensions, it will be appreciated that pulse "stacking" will occur with other cores the fundamental resonant frequency of which is equal either to $n$ times the repetition frequency of the input pulses, or, alternatively, to $1/n$ times such pulse repetition frequency. The fundamental resonant frequency of the core accordingly may be broadly expressed by the formula $n^{+1}f$, where $n$ is a small integer and $f$ is the repetition frequency of the input pulses.

While the magnetostrictive devices of the present invention are particularly adapted for use in television receiving circuits, it will be readily appreciated that they may be incorporated in many other types of circuit arrangements, such as those found in radar systems and multi-path telephony. They may also be useful in measuring the thickness of partially inaccessible objects as well as for the detection of flaws in metals.

Having thus described my invention, I claim:

1. In a television receiving system of the type in which an electron beam is developed within a cathode ray tube and then deflected to scan a fluorescent target area and thereby effect the line-by-line reconstitution of an image, and in which this line-by-line scanning action of the said electron beam is carried out under the control of received synchronizing pulses which are frequently intermixed with spurious noise impulses, the combination of a filter circuit for substantially precluding the possibility of said spurious noise impulses affecting the synchronized line-by-line scanning action of said cathode ray beam, said filter circuit including a magnetostrictive device energized by said received synchronizing pulses and providing an effectively amplified synchronizing pulse output in which the said intermixed noise impulses are reduced to relatively negligible amplitude, a sawtooth wave generating network, a power output tube connected to deliver cyclically varying energy under the control of the sawtooth wave output of said network to effect the line-by-line scanning action of said electron beam, and a circuit for applying the said amplified synchronizing pulse output of said magnetostrictive device to said network to control the generation of sawtooth waves and hence the operation of said power output tube.

2. A television receiving system in accordance with claim 1, in which said sawtooth wave generating network includes a discharge tube, and in which the said amplified synchronizing pulse output of said magnetostrictive device is applied to the control electrode of said discharge tube.

3. In a television receiving system of the type in which an electron beam is developed within a cathode ray tube and then deflected to scan a fluorescent target area and thereby effect the reconstitution of an image, and in which the said scanning action is carried out under the control of received synchronizing pulses which are frequently intermixed with spurious noise impulses, the combination of a filter circuit for substantially precluding the possibility of said spurious noise impulses affecting the synchronized scanning action of said cathode ray beam, said filter circuit including a magnetostrictive device comprising a plurality of hollow elongated members composed of magnetostrictive material and arranged in closely grouped parallel relation, at least a portion of said tubular members having diameters which are large in relation to their wall thickness, said hollow elongated members forming in effect a unitary core assembly, an input coil encircling one portion of the said core assembly, means for establishing a polarizing magnetic flux through said core assembly, means for applying said synchronizing pulses to said input coil to energize the latter and thereby produce a magnetostrictive vibration of said core assembly, a further coil encircling another portion of said core assembly to derive from the vibrational energy in said core a series of synchronizing pulses the amplitude of which is greater than the amplitude of the synchronizing pulses applied to said input coil, a wave-generating network, an electron discharge device connected to deliver cyclically varying energy under the control of the waves generated by said network to bring about the said scanning action of said electron beam, and a circuit for applying the synchronizing pulse output of said further coil to govern the operation of said wave-generating network.

4. In a television receiver, a source of synchronizing pulses, said source having a pair of output terminals, a deflecting wave generator having a pair of input terminals, said generator being controllable in response to pulses applied to said input terminals, a magnetostrictive rod, said rod being longitudinally resonant at a frequency equal to the product of $n+1$ times $f$, where $n$ is a small integer and $f$ is the repetition frequency of the pulses supplied by said source, means for passing a substantially fixed magnetic flux through said magnetostrictive rod, inductive means for magnetically coupling said rod to the said output terminals of said source, and means for coupling said rod to the said input terminals of said deflecting wave generator.

5. In a television receiver, a source of synchronizing pulses, said pulses having a pulse repetition period of $p$ microseconds, said source having a pair of output terminals, a deflecting wave generator having a pair of input terminals, said generator being controllable in response to pulses applied to said input terminals, a magnetostrictive core element, said element being of such length that a period of substantially $p$ microseconds is required for a vibrational pulse to pass from one end of said element to the other end thereof, means for passing a substantially fixed magnetic biasing-flux through said element, means including a winding for coupling one end of said element to the said output terminals of said source, and means including a second winding for coupling the other end of said element to the input terminals of said deflecting wave generator.

6. The combination claimed in claim 5, characterized in that said magnetostrictive core element comprises a plurality of tubes of small diameter, the wall thickness of said tubes being small compared with the diameter thereof.

CARLO V. BOCCIARELLI.

REFERENCES CITED

The following references are of record in the file of this patent:

UNITED STATES PATENTS

| Number | Name | Date |
|---|---|---|
| 2,091,250 | Blackman | Aug. 31, 1937 |
| 2,166,359 | Lakatos | July 18, 1939 |
| 2,170,206 | Mason | Aug. 22, 1939 |
| 2,252,599 | Lewis | Aug. 12, 1941 |
| 2,255,839 | Wilson | Sept. 16, 1941 |

FOREIGN PATENTS

| Number | Country | Date |
|---|---|---|
| 363,848 | Italy | Oct. 14, 1938 |